US008495627B2

(12) United States Patent  
Barsness et al.

(10) Patent No.: US 8,495,627 B2
(45) Date of Patent: Jul. 23, 2013

(54) RESOURCE ALLOCATION BASED ON ANTICIPATED RESOURCE UNDERUTILIZATION IN A LOGICALLY PARTITIONED MULTI-PROCESSOR ENVIRONMENT

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1544 days.

(21) Appl. No.: 11/769,185

(22) Filed: Jun. 27, 2007

(65) Prior Publication Data
US 2009/0007125 A1    Jan. 1, 2009

(51) Int. Cl.
*G06F 9/455*      (2006.01)
*G06F 9/46*      (2006.01)

(52) U.S. Cl.
USPC .............................................. 718/1; 718/105

(58) Field of Classification Search
USPC ...................................................... 718/105, 1
See application file for complete search history.

(56) References Cited

U.S. PATENT DOCUMENTS

| 6,931,395 | B2 | 8/2005 | Day et al. |
| 6,957,435 | B2 | 10/2005 | Armstrong et al. |
| 7,290,259 | B2 * | 10/2007 | Tanaka et al. ..................... 718/1 |
| 7,574,424 | B2 * | 8/2009 | Chowdhuri ........................... 1/1 |
| 2003/0055864 | A1 * | 3/2003 | Armstrong et al. ........... 709/107 |
| 2003/0158884 | A1 * | 8/2003 | Alford, Jr. ..................... 709/104 |
| 2005/0125802 | A1 * | 6/2005 | Wang et al. ................... 718/108 |
| 2006/0070067 | A1 * | 3/2006 | Lowery ......................... 718/100 |

* cited by examiner

*Primary Examiner* — MengYao Zhe
*Assistant Examiner* — Brian Chew
(74) *Attorney, Agent, or Firm* — Wood, Herron & Evans LLP

(57) ABSTRACT

A method, apparatus and program product for allocating resources in a logically partitioned multiprocessor environment. Resource usage is monitored in a first logical partition in the logically partitioned multiprocessor environment to predict a future underutilization of a resource in the first logical partition. An application executing in a second logical partition in the logically partitioned multiprocessor environment is configured for execution in the second logical partition with an assumption made that at least a portion of the underutilized resource is allocated to the second logical partition during at least a portion of the predicted future underutilization of the resource.

22 Claims, 6 Drawing Sheets

| Command | Outage time | | |
|---|---|---|---|
| | Minimum | Average | Maximum |
| PWRDWNSYS | 10 | 15 | 30 |
| ENDSBS *ALL | 5 | 10 | 15 |
| ENDTCP *ALL | 5 | 7 | 15 |
| db2 stop | 20 | 30 | 40 |
| stop server.sh | 15 | 20 | 25 |
| . | . | . | . |
| . | . | . | . |
| . | . | . | . |

FIG. 5

| Partition | Timeframe | Resource Available |
|---|---|---|
| A | Daily 12:00-13:00 | 1 Processor |
| B | Daily 18:00-24:00 | 0.5 Processor |
| C | Weekly Sat./Sun. 0:00-23:59 | 2 Processors |
| . | . | . |
| . | . | . |
| . | . | . |

FIG. 6

RESOURCE ALLOCATION BASED ON ANTICIPATED RESOURCE UNDERUTILIZATION IN A LOGICALLY PARTITIONED MULTI-PROCESSOR ENVIRONMENT

FIELD OF THE INVENTION

The present invention generally relates to computers and data processing and, more particularly, resource utilization in a logically partitioned computing environment.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

One logical extension of parallel processing is the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared program, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer. For each task executing within a logical partition, the task is typically limited to only the resources assigned to that partition, and thus the task is not permitted to access any resources assigned to other partitions.

While in some instances, resources such as processors are required to be assigned to only one partition, some architectures support micro-partitioning, which provides the capability to run more partitions on a computer than the number of physical microprocessors. There are generally two types of micro-partitions, "capped" and "uncapped". A capped partition is not allowed to exceed its initial resource entitlement, while an uncapped partition is. An uncapped partition is typically only limited in its ability to consume system resources by the lack of availability of the actual resource.

Capped and uncapped partitions make use of a shared processor pool, which is a group of physical processors that provide processing capacity as a resource. This resource may be shared amongst partitions, where a partition can be assigned whole or partial "slices" of a processor. There may be additional tuning parameters for shared processor partitions to define the relative priority of the partition and its shares of the physical processors as well. The number of virtual processors may limit the maximum amount of processor capacity for an uncapped partition. A virtual processor is a portion of a physical processor's capacity as presented to a partition. Thus, a virtual processor may represent from 10% to 100% of a real processor. An uncapped partition, for example, defined with a total of three virtual processors and an entitled capacity of two processors would normally use only two processors' worth of computing power. If the partition needed more processor resources and there was excess capacity available (i.e., unused by any other partition) in the share processor pool, the partition could use up to three processors worth of capacity.

In contrast, a capped partition with a similar definition could only use up to two processors capacity, even if there was excess processor capacity available in the shared pool. Thus, an uncapped partition is guaranteed a minimum resource level, with the potential to use more, and a capped partition is guaranteed a maximum capacity. The former creates a minimum service level for the partition; the latter guarantees a capacity that cannot be exceeded and cannot impact the overall behavior of the physical system.

Uncapped partitions enable users to utilize resources when other partitions are not active, or when they are not using all of the allocated processor power. Automatic resource switching may be a welcome feature to system administrators and performance analysts that look at the overall capabilities of a computer system. This ability may also open the door for the operating system itself to take advantage of this capability and automatically shift resources to other applications, such as batch processing or other resource intensive applications like database query optimization. As is commonly known with database query optimization, the optimizer makes decisions on which access plan(s) to use or generate based on the available system resources as well as the physical database being queried. Therefore the amount of processing power available to a partition executing a database query optimization as well as the amount of memory may greatly influence the decisions an optimizer makes.

Similarly, batch processing consumes system resources and may affect overall system performance when the system is also being used interactively. More batch processing could be performed if additional system resources were to become available. Likewise, batch processing may be suspended until minimum levels of resources are available to avoid performance issues with interactive users.

What is needed therefore is a method to take advantage of the underutilization of resources in a logically partitioned multiprocessor environment to optimize performance by accounting for the underutilization of the resources.

SUMMARY OF THE INVENTION

An embodiment of the invention provides a method for allocating resources in a logically partitioned multiprocessor environment. Resource usage is monitored in a first logical partition in the logically partitioned multiprocessor environment to predict a future underutilization of a resource in the first logical partition. An application executing in a second logical partition in the logically partitioned multiprocessor environment may be configured for execution in the second logical partition with an assumption made that at least a portion of the underutilized resource is allocated to the second logical partition during at least a portion of the predicted future underutilization of the resource. Configuring of the application in the second logical partition may be performed prior to a time associated with the predicted future underutilization of the resource.

Monitoring functions of the system resources to determine underutilization may be implemented in a partition manager, such as a hypervisor, of the logically partitioned computing environment. Because the hypervisor manages the physical resources for all of the logical partitions on the computer, it may be configured to communicate predicted underutilization of resources to logical partitions and reallocate the resources to those partitions during the predicted underutilization period. The application in the second partition may then be executed at the time associated with the predicted future underutilization of the resource where at least a portion of the resource is allocated to the second logical partition by the hypervisor.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 5 is a table containing exemplary commands to monitor, which are used to predict future underutilization of a resource.

FIG. 6 is a table containing exemplary scheduled down times for logical partitions used to predict future underutilization of a resource.

DETAILED DESCRIPTION

Embodiments consistent with the invention may be configured to allocate resources in a logically partitioned multiprocessor environment. Resource usage in a first logical partition in the logically partitioned multiprocessor environment is monitored to predict a future underutilization of a resource by the partition. This underutilized resource may then be used by other partitions during the predicted period by configuring tasks or applications in the other partitions to run with the assumption made that the underutilized resource will be available when those tasks or applications ultimately run. For example, the temporary reallocation of anticipated underutilized resource may then be applied to partitions running batch processes. The batch processor may use the information about the predicted underutilized resource to determine amount and duration of the additional resource and the number of batch jobs to execute during the availability of the additional resource. The batch processor may then unsuspend queued batch jobs at the predicted time. The additional batch jobs may execute during the predicted time and then the batch processor may resuspend any uncompleted jobs at the end of the predicted period, when the resource is no longer available. Similarly, a database query optimizer may use this information when generating query plans. The query optimizer may make decisions assuming the additional, underutilized resource is available when generating the query plan. That query plan may then be executed during the predicted underutilization period when the additional resource is actually available.

Figure 1:
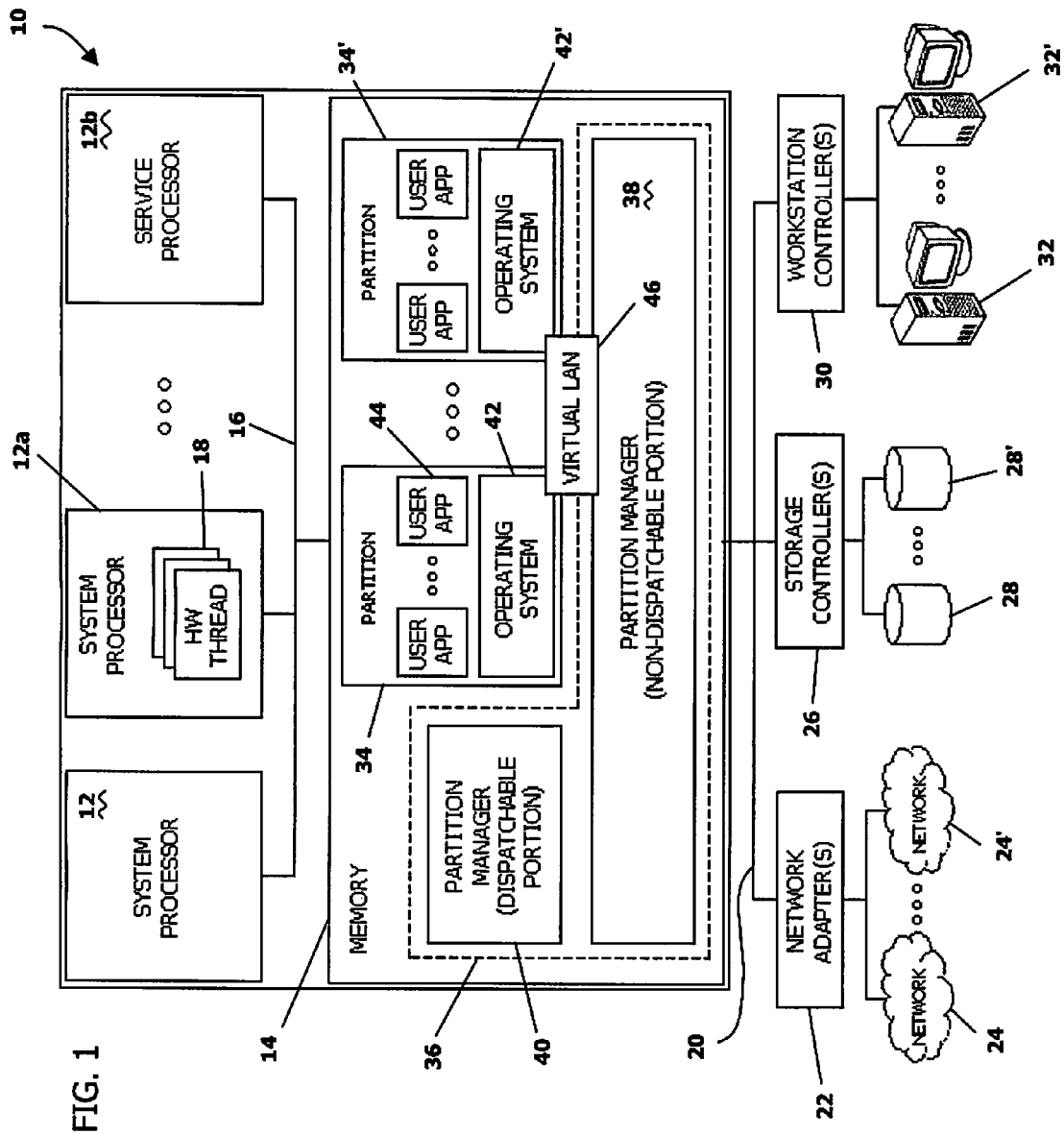
FIG. 1 is a block diagram of the principal hardware components in a logically partitioned computer consistent with the invention.

Turning now to the drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38, which is also referred to herein as "PLIC", provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40, or alternatively "PHYP". In contrast to non-dispatchable portion 38, which has no concept of tasks, is run with memory relocation off, and is accessible via supervisor function calls from higher layers of software, the dispatchable portion 40 has the concept of tasks (like any operating system), and is run with memory relocation on. The dispatchable portion typically executes in much the same manner as a partition, except that it is hidden from the user. The dispatchable portion generally manages higher level partition management operations such as creating and deleting partitions, concurrent hardware maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative, hardware resources can be allocated to only one logical partition at a time.

Additional resources, e.g., mass storage, backup storage, user input, network connections, display devices, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time. In addition, some resources may be "virtual" in nature, e.g., virtual network adapters used in a virtual local area network.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable medium used to actually carry out the distribution. Examples of computer readable medium include, but are not limited to, physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
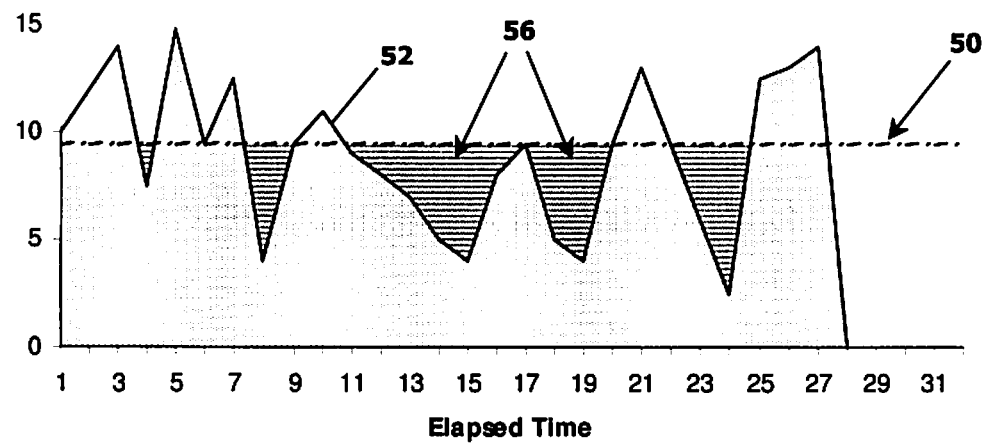
FIG. 2 is a graph of CPU usage for an uncapped logically partitioned computer consistent with the invention.
Figure 3:
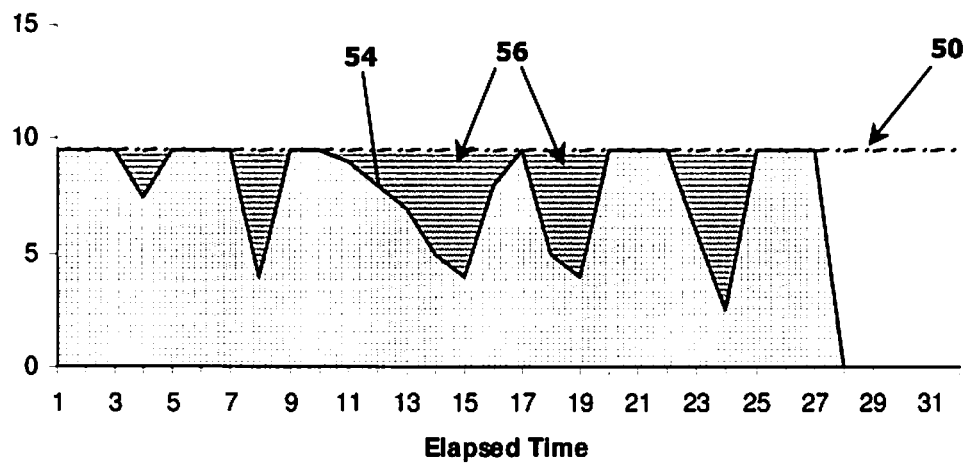
FIG. 3 is a graph of CPU usage for a capped logically partitioned computer consistent with the invention.

The logically partitioned computing environment illustrated in FIG. 1 may be configured with capped partitions, uncapped partitions or a combination both capped and uncapped partitions. Exemplary CPU utilization for an uncapped and a capped logical partition may be seen in FIGS. 2 and 3. The physical processors 12 as discussed above may be further divided into virtual processors, which may represent fractions of physical processors 12. For example, a virtual processor may represent ten percent of a physical processor. In the examples illustrated in FIGS. 2 and 3, the capped processor line 50 is set at a maximum of 9.5 virtual processors. As can be seen in FIG. 2, the processor utilization curve 52 spikes over the cap line for the uncapped logical partition. In contrast, the cap line 50 for the capped logical partition utilization curve 54 becomes a hard ceiling and processor utilization will not exceed that limit. Both the capped and uncapped logical partitions also have periods of underutilization 56. Unutilized processor resources for these logical partitions may be reallocated to another logical partition during the unutilized period to provide temporary additional resources for that partition. If the logical partition receiving the resource is a capped partition, then the additional resource will also be capped at the cap line 50. Uncapped partitions, however, may benefit more from the additional resource as the additional resource will be allowed to exceed the processor cap 50.

Embodiments of the invention may monitor resource utilization during the operation of a logical partition to be able to predict resource underutilization, enabling other logical partitions and/or the applications executing in such other logical partitions to be optimally configured to execute when the resource underutilization ultimately occurs. Resource underutilization may be related to specific system commands or functions, which release resources as they execute, shut down, or restart. Underutilization may also be related to historical performance of a logical partition, such as the partition is always shut down for maintenance between 12:00 pm and 1:00 pm. Knowing these types of activities may allow a resource or partition manager to be able to predict when additional resources from a logical partition will be available. That resource may then be temporarily reallocated to another logical partition and be used by applications in the other partition, e.g., database query optimizer or batch jobs that may have been previously suspended.

Figure 4:
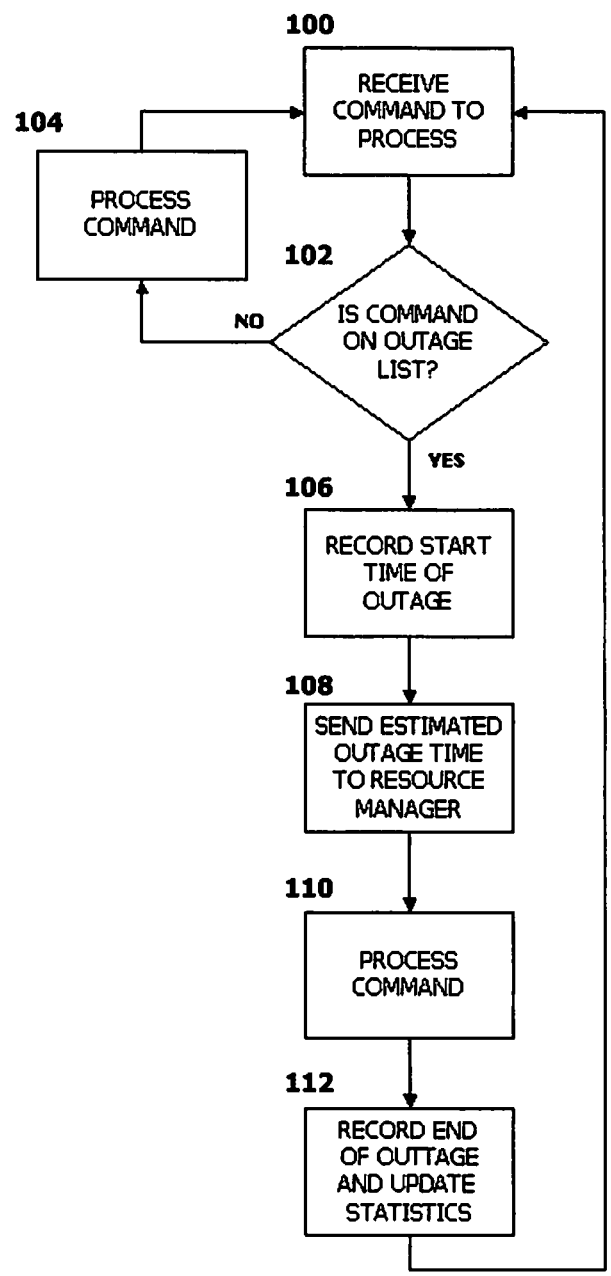
FIG. 4 is a flowchart depicting an exemplary process for monitoring system functions to predict future underutilization of a resource.

Certain system functions provide for a release of resources, which may cause a temporary underutilization of that resource. For example, as shown in FIG. 4, a process for determining the amount of resource may monitor a set of commands that are known to release resources when they execute. The process may monitor the execution of these commands to track and update the usage of the resources for later use in predicting underutilization. In the exemplary process in FIG. 4, a command, such as a system command, is received to be processed in block 100. This command may then be checked against a list of commands that are known to release resource for usable amounts of time in block 102 (see FIG. 5). If the command is not on the list (no branch of decision block 102) then the command is processed in block 104 and then the next command is received. If, however, the command is on the list (yes branch of decision block 102) then the start time of the outage resulting from the command is recorded in block 106. An estimate of the outage time is sent to the resource manager in block 108 so that the resources may be temporarily reallocated for the estimated time. The command is then processed in block 110 and at the completion of the command, in block 112, the end time for the outage is recorded and statistics for the command are updated to provide a better time estimate the next time that the command is issued.

FIG. 5 is a table showing example commands that may be monitored. Each of these commands may cause a partition to give up its CPU for a certain period of time. For example, if in a partition A a PWRDWNSYS command is issued, and statistical data as discussed above has been collected for the command to predict the amount of time for the IPL, other partitions will know that for a given period of time after the PWRDWNSYS command has been executed, that these other partitions will have cycles available for processing. If these extra cycles were utilized by a partition executing database queries, then the query optimizer may make different decisions based on the predicted new resource that will available to the partition when generating query plans that may be executing when the resource is actually available. If the extra processor resource is allocated to a partition that has pending batch jobs, the batch processes may be unsuspended or the additional resource may be used to process additional concurrent batch jobs.

This also applies to commands that put a system or a partition into a restricted state, commands that cause subsystems to end, etc. For example, ending a J2EE application server subsystem that traditionally consumes most of the processor resources on a computer may cause other partitions to know that the processor resource will be available for a period of time that the subsystem is down. Additionally, the time it takes to bring the subsystem back up or restart the subsystem may also be tracked and used. Other monitoring commands may include ENDTCP or any other command that ends a given set of processes or jobs. Startup commands may also be monitored, keeping track of that amount of time it takes for jobs or processes to begin.

Figure 7:
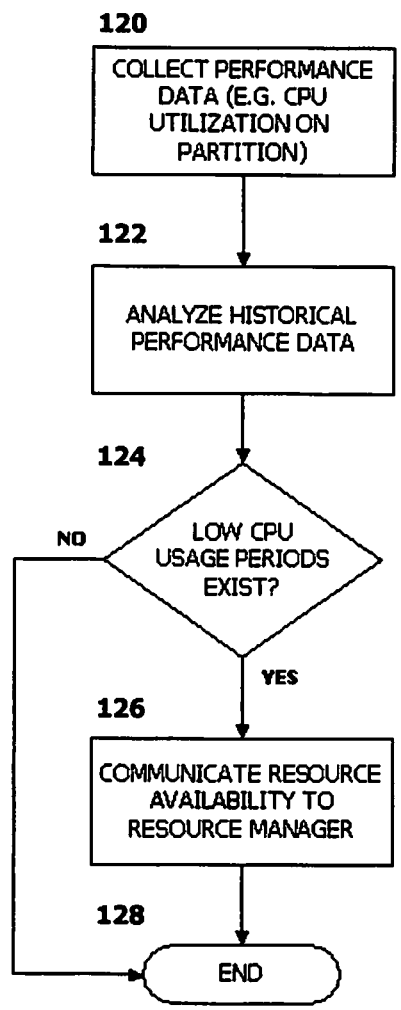
FIG. 7 is a flowchart depicting an exemplary process for analyzing historical performance data for predicting future underutilization of a resource.

As discussed above, in addition to tracking system commands to predict resource underutilization, the overall historical data for a partition may be used to find patterns of common resource underutilization. FIG. 6 is a table containing exemplary times and resource availability during those times for different logical partitions. To collect this type of data, a computer and its logical partitions may be profiled to detect repeatable patterns. Traditionally this type of monitoring would be used to find spikes in resource utilization. Here, however, the system and partitions are being monitored to anticipate how much processor resource will be available for a given partition. The flowchart in FIG. 7 depicts an exemplary process for determining available resource. Performance data, such as processor utilization on a partition (similar to the graphs in FIGS. 2 and 3), is collected in block 120. This performance data is analyzed in block 122 to look for common low periods of processor usage. If the analysis determines that there are common low periods of processor usage (yes branch of decision block 124), these periods are communicated to the resource manager in block 126 for later reallocation of the resource.

As an example, a computer may have four partitions. One partition, a production partition, may execute a web application that consistently performs database operations. A second partition may be set up as a test partition for the production partition. The third partition may be a development partition and the fourth partition may be a second test partition for a Linux operating system development team. Assuming that each partition is allocated two processors, and under normal operating circumstances, a database optimizer executing in the production partition will be making decisions based on the availability of the two assigned processors. Through profiling and analysis of the profile data, it may be determined that between 11:00 am and 1:00 pm each week day that four of the six processors associated with the second, third and fourth partitions are available to use with the primary partition. Knowing this information, the resource manager may then allocate four additional processors to the production partition each weekday between 11:00 am and 1:00 pm. The database optimizer, running as part of the web application in the production partition may then make optimization decisions based on having the resources of six processors instead of two.

Figure 8:
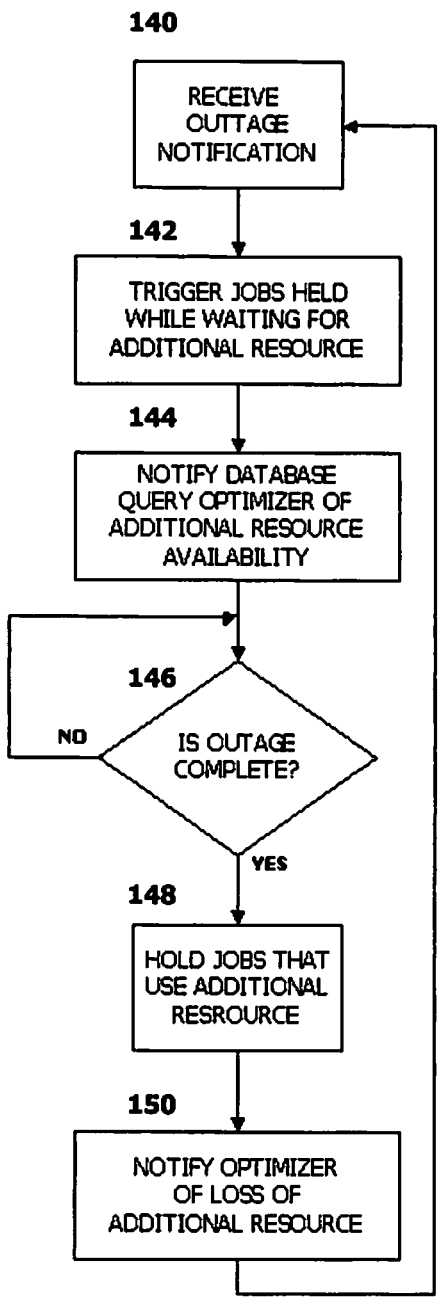
FIG. 8 is a flowchart depicting an exemplary process for allocating predicted underutilized resources.

The flowchart in FIG. 8 is an exemplary illustration of how the additional resource is allocated to a partition. The resource manager receives an outage notification from a logical partition in block 140. Alternately, the resource manager may know based on a specific time that additional resource has become available. The additional resource may then be assigned to another partition which may trigger any jobs held that were waiting for additional resource in block 142, such a batch processing jobs, or a database query optimizer may be notified of the additional resource availability in block 144. If the term of the resource availability has ended (yes branch of decision block 146), the resource is reallocated to its original partition, jobs in some partitions may be suspended in block 148 and the query optimizer may be notified of the change in available CPU for decision making in block 150. The resource manager then continues to wait for the next outage notification or time period when resource may be available.

The resource manager may also watch for broken patterns. Broken patterns occur when the partition that has given up resource due to underutilization of a resource suddenly begins to use the resource. When this occurs, the procedure is similar to that above in FIG. 8 when the resource becomes unavailable. Any jobs that require the additional resource are suspended. Query optimizers for database queries are notified of the reduction in CPU resource and the resource is reallocated to the original partition. Broken patterns may be tracked with other performance data to update the periods of underutilization.

Through regular monitoring of the system resources and broken patterns, existing periods of resource underutilization may be adjusted or eliminated. Likewise, new periods of resource underutilization may be created. The regular monitoring of overall system performance combined with the monitoring of system commands allows for the anticipation of the extra resource available to partitions on a system for a given time period and then dynamically reallocating the resource to other partitions on the system to provide additional resource and minimize overall underutilization.

As discussed above, a hypervisor or partition manager typically manages the logical partitions of a logically partitioned environment. Because it controls access to the physical resources of the system, the hypervisor is capable of performing both the monitoring functions as well as the reallocation of the resources during the predicted underutilization periods. Some conventional hypervisors have the ability to set "weights" for different logical partitions to be used to divide up and allocate any excess capacity to those logical partitions. By incorporating the monitoring and reallocation functions within the hypervisor, the hypervisor would be able to additionally communicate the predicted underutilization of resource from any logical partition to any other logical partitions and then reallocate the underutilized resource to any of the other logical partitions that need or want the resource, based on weighted values. It will be appreciated, however, that in other environments, some or all of the function allocated to the hypervisor may be handled by other components in the logically partitioned environment.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method for allocating resources in a logically partitioned multiprocessor environment, the method comprising:
    monitoring resource usage in a first logical partition in the logically partitioned multiprocessor environment to predict a future underutilization of a resource in the first logical partition, wherein monitoring resource usage includes monitoring a set of commands known to release resources when executed including checking commands to be executed at the first logical partition to determine whether a respective command to be executed at the first logical partition corresponds to the set of commands known to release resources when executed, and wherein predicting the future underutilization of the resource is based on whether the respective command to be executed by the first logical partition corresponds to the set of commands known to release resources when executed;
    in response to determining that the respective command corresponds to the set of commands known to release resources when executed, communicating the predicted future underutilization to a database query optimizer executing in a second logical partition in the logically partitioned multiprocessor environment such that the database query optimizer generates a query plan for a query to be executed during at least a portion of the predicted future underutilization of the resource with the query plan optimized to utilize at least a portion of the resource during execution of the query plan; and
    executing the query plan generated by the database query optimizer in the second partition utilizing the portion of the resource at a time associated with the predicted future underutilization of the resource and while the portion of the resource is allocated to the second partition,
    wherein communicating the predicted underutilization to the database query optimizer is performed prior to the time associated with the predicted future underutilization of the resource and execution of the query plan while the portion of the resource is allocated to the second partition.

2. A method for allocating resources in a logically partitioned multiprocessor environment, the method comprising:
    monitoring resource usage in a first logical partition in the logically partitioned multiprocessor environment to predict a future underutilization of a resource in the first logical partition, wherein monitoring resource usage includes monitoring a set of commands known to release resources when executed, wherein predicting the future underutilization of the resource is based on whether the first logical partition receives a respective command for execution corresponding to the set of commands known to release resources when executed;
    in response to the first logical partition receiving the respective command, configuring an application for execution in a second logical partition in the logically partitioned multiprocessor environment with an assumption made that at least a portion of the resource is allocated to the second logical partition during at least a portion of the predicted future underutilization of the resource, wherein the application comprises a database query optimizer; and executing the application in the second partition at the time associated with the predicted future underutilization of the resource while the portion of the resource is allocated to the second logical partition.

3. The method of claim 2 wherein configuring the application is performed prior to a time associated with the predicted future underutilization of the resource.

4. The method of claim 2 wherein monitoring resource usage further comprises:
monitoring an event.

5. The method of claim 4 wherein monitoring resource usage further comprises:
tracking at least one of resource consumption, execution, and down times of the event; and
identifying repeatable patterns of resource underutilization.

6. The method of claim 4 wherein the event is an application program or a subsystem restart.

7. The method of claim 2 further comprising:
checking the first partition for a broken pattern of resource usage; and
in response to finding the broken pattern of resource usage, reconfiguring the application executing in the second logical partition and reallocating the portion of the resource to the first logical partition.

8. The method of claim 7 wherein utilization of the resource by the first logical partition during the predicted underutilization of the resource creates the broken pattern of resource usage.

9. The method of claim 2 wherein the database query optimizer is configured to generate a query plan for a query based on the predicted availability of the resource to the second logical partition when the query plan will be executed.

10. The method of claim 2 wherein the resource is processor time.

11. The method of claim 2 wherein the application comprises a job executing in a batch mode.

12. An apparatus comprising:
a processor; and
program code configured to be executed by the processor to allocate resources in a logically partitioned multiprocessor environment, the program code configured to monitor resource usage in a first logical partition in the logically partitioned multiprocessor environment to predict a future underutilization of a resource in the first logical partition, and configure an application for execution in a second logical partition in the logically partitioned multiprocessor environment with an assumption made that at least a portion of the resource is allocated to the second logical partition during at least a portion of the predicted future underutilization of the resource, wherein the application comprises a database query optimizer, wherein the program code is configured to monitor resource usage in the first logical partition by monitoring a set of commands known to release resources when executed, wherein the program code is configured to predict the future underutilization of the resource based on whether the first logical partition receives a respective command for execution corresponding to the set of commands known to release resources when executed, wherein the program code is configured to configure the application for execution in the second logical partition in response to the first logical partition receiving the respective command, and wherein the program code is further configured to execute the application in the second partition at the time associated with the predicted future underutilization of the resource while the portion of the resource is allocated to the second logical partition.

13. The apparatus of claim 12 wherein configuring the application is performed prior to a time associated with the predicted future underutilization of the resource.

14. The apparatus of claim 12 wherein the program code is further configured to monitor resource by monitoring an event.

15. The apparatus of claim 14 wherein the program code is further configured to monitor resource usage by tracking at least one of resource consumption, execution, and down times of the event, and identifying repeatable patterns of resource underutilization.

16. The apparatus of claim 14 wherein the event is an application program or a subsystem restart.

17. The apparatus of claim 12 wherein the program code is further configured to check the first partition for a broken pattern of resource usage, and in response to finding the broken pattern of resource usage, reconfigure the application executing in the second logical partition and reallocate the portion of the resource to the first logical partition.

18. The apparatus of claim 17 wherein utilization of the resource by the first logical partition during the predicted underutilization of the resource creates the broken pattern of resource usage.

19. The apparatus of claim 12 wherein the database query optimizer is configured to generate a query plan for a query based on the predicted availability of the resource to the second logical partition when the query plan will be executed.

20. The apparatus of claim 12 wherein the application comprises a job executing in a batch mode.

21. A program product, comprising:
a non-transitory computer readable medium; and
program code resident on the computer readable medium and configured to allocate resources in a logically partitioned multiprocessor environment, the program code configured to monitor resource usage in a first logical partition in the logically partitioned multiprocessor environment to predict a future underutilization of a resource in the first logical partition, and configure an application for execution in a second logical partition in the logically partitioned multiprocessor environment with an assumption made that at least a portion of the resource is allocated to the second logical partition during at least a portion of the predicted future underutilization of the resource, wherein the application comprises a database query optimizer, wherein the program code is configured to monitor resource usage in the first logical partition by monitoring a set of commands known to release resources when executed, wherein the program code is configured to predict the future underutilization of the resource based on whether the first logical partition receives a respective command for execution corresponding to the set of commands known to release resources when executed, wherein the program code is configured to configure the application for execution in the second logical partition in response to the first logical partition receiving the respective command, and wherein the program code is further configured to execute the application in the second partition at the time associated with the predicted future underutilization of the resource while the portion of the resource is allocated to the second logical partition.

22. The program product of claim 21 wherein configuring the application is performed prior to a time associated with the predicted future underutilization of the resource.

* * * * *